(12) United States Patent
Muntz

(10) Patent No.: US 8,825,789 B2
(45) Date of Patent: Sep. 2, 2014

(54) METHOD AND APPARATUS TO IMPLEMENT A HIERARCHICAL CACHE SYSTEM WITH PNFS

(75) Inventor: Daniel Alan Muntz, Cupertino, CA (US)

(73) Assignee: NetApp, Inc., Sunnyvale, CA (US)

(\*) Notice: Subject to any disclaimer, the term of this patent is extended or adjusted under 35 U.S.C. 154(b) by 1255 days.

(21) Appl. No.: 12/336,388

(22) Filed: Dec. 16, 2008

(65) Prior Publication Data

US 2010/0153415 A1    Jun. 17, 2010

(51) Int. Cl.
*G06F 15/167*    (2006.01)
*G06F 17/30*    (2006.01)
*H04L 29/08*    (2006.01)

(52) U.S. Cl.
CPC ...... *H04L 67/1097* (2013.01); *G06F 17/30132* (2013.01); *H04L 67/2885* (2013.01); *G06F 17/30224* (2013.01); *H04L 67/2842* (2013.01)
USPC ........................................................ 709/213

(58) Field of Classification Search
CPC ... G06F 3/067; G06F 17/30; G06F 17/30194; G06F 17/30283; G06F 17/30132; H04L 67/1097; H04L 67/2842; H04L 67/288
USPC ........................................................ 709/213
See application file for complete search history.

(56) References Cited

U.S. PATENT DOCUMENTS

| 6,330,652 | B1 | 12/2001 | Robb | |
|---|---|---|---|---|
| 2002/0099906 | A1* | 7/2002 | Chan et al. | 711/111 |
| 2003/0028695 | A1* | 2/2003 | Burns et al. | 710/200 |
| 2007/0260609 | A1* | 11/2007 | Tulyani | 707/10 |
| 2007/0276838 | A1 | 11/2007 | Abushanab et al. | |
| 2007/0294422 | A1 | 12/2007 | Zuckerman et al. | |
| 2008/0168221 | A1* | 7/2008 | Ballew et al. | 711/113 |

FOREIGN PATENT DOCUMENTS

KR    20040024625 A    3/2004

OTHER PUBLICATIONS

Dykes et al. Taxonomy and Design Analysis for Distributed Web Caching. Proceedings of the 32$^{nd}$ Hawaii International Conference on System Sciences. IEEE. 1999. pp. 1-10.*
Welch, Brent. pNFS: High Performance Parallel IO for the NFS Standard. www.panasas.com/docs/SC06_pnfs_panel_ppt.pdf. Mar. 21, 2007. pp. 1-15.*
Velusamy, V. et al. "Quality of Service support for Grid Storage Environments". Proceedings of the 2006 International Conference on Grid Computing & Applications, GCA 2006, Las Vegas, Nevada, USA, Jun. 26-29, 2006. pp. 1-7.*
Hildebrand, D. and Honeyman, P. "Scaling NFSv4 with Parallel File System". CITI Technical Report. Mar. 7, 2005. pp. 1-9.*

(Continued)

*Primary Examiner* — John MacIlwinen
(74) *Attorney, Agent, or Firm* — Perkins Coie LLP

(57) ABSTRACT

A method implements a hierarchical cache system with a parallel Network File System (pNFS) configuration for a storage system. Upon receiving a request by the hierarchical cache system to access data stored in the storage system, the method divides the data into a plurality of data segments and distributes the plurality of data segments to a plurality of cache servers of the cache system. The method responds to the request a metadata layout for the plurality of data segments distributed among the plurality of cache servers. Based on the metadata layout, the plurality of data segments can be concurrently retrieved from the plurality of cache servers.

27 Claims, 5 Drawing Sheets

(56) References Cited

OTHER PUBLICATIONS

Eisler, M. "Metadata Striping for pNFS". draft-eisler-nsfv4-pnfs-metastripe-01.txt. Oct. 27, 2008. 19 pages.*

Harris, R. "Parallel NFS: Finally, NFS Optimized for Clusters". Data Mobility Group. May 30, 2007. pp. 1-8.*

Weil, S. "Ceph: A Scalable, High-Performance Distributed File System". USENIX Association. 2006. pp. 307-320.*

Hildebrand, D. "Direct-pNFS: Scalable, transparent, and versatile access to parallel file systems" HPDC'07. Jun. 2007. pp. 199-208.*

Hildebrand, D. "Large Files, Small Writes, and pNFS". ICS06. Jun. 2006. pp. 116-124.*

"NFSv4.1's pNFS for Solaris: theShepler" blogs.sun.som. Jun. 28, 2007. pp. 1-7.*

Hartman, J. "The Zebra Striped Network File System". SIGOPS'93. 1993. pp. 29-43.*

Corbett, P. "pNFS: Extensions to NFSv4 to Support Data Distribution and Parallelism". NetApp Memo. Nov. 27, 2003. pp. 1-7.*

Xu, Y. and Fleisch, B. "NFS-cc: Tuning NFS for Concurrent Read Sharing". Mar. 23, 2004. pp. 1-11.*

Huber, J. "PPFS: A High Performance Portable Parallel File System". ICS'95. ACM, 1995. pp. 385-394.*

International Search Report PCT/US2009/068300 dated Aug. 16, 2010, pp. 1-3.

Written Opinion PCT/US2009/068300 dated Aug. 16, 2010, pp. 1-5.

Gibson, et al. "pNFS Problem Statement" Panasas Inc. & CMU http://www.pdf.cmu.edu/pNFS/archive/gibson-pnfs-problem-statement, Jul. 2004, 12 pages.

* cited by examiner

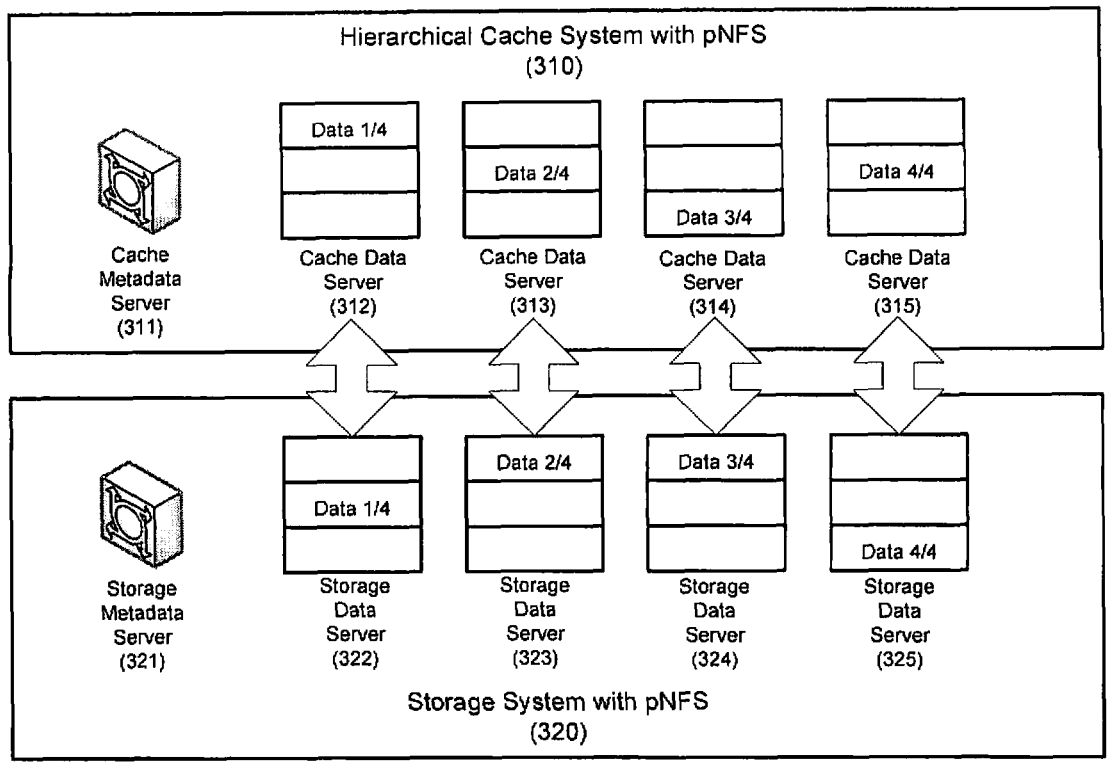
Fig. 3-A
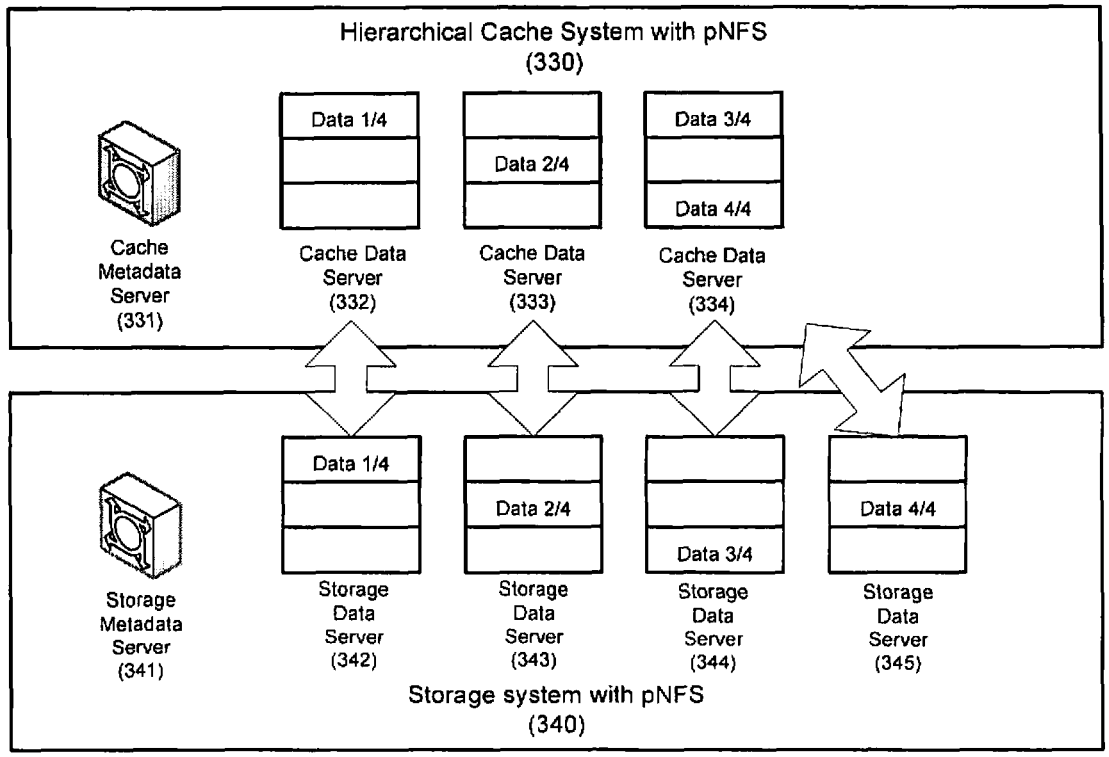
Fig. 3-B

METHOD AND APPARATUS TO IMPLEMENT A HIERARCHICAL CACHE SYSTEM WITH PNFS

FIELD OF THE INVENTION

At least one embodiment of the present invention pertains to network storage systems, and more particularly, to the implementation of a hierarchical cache system with parallel Network File System (pNFS) for the network storage systems.

BACKGROUND

A storage server is a computer system and a form of storage controller that is used to store and retrieve data on behalf of one or more clients on a network. A storage server operates on behalf of one or more clients to store and manage data in a set of mass storage devices, such as magnetic or optical storage-based disks or tapes. A storage server may be configured to service file-level requests from clients, as in the case of file servers used in a Network Attached Storage (NAS) environment. Alternatively a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

A storage server can support multiple protocols in providing storage services to client systems. For example, Network File System (NFS) is one of the protocols that allow files stored in a storage server to be accessed from a network. A storage server that supports the NFS protocol can export a file system contained in the storage server to the external network via one or more mount points. An NFS client system can then mount one of the exported NFS mount points to a storage entity (e.g., a directory or a drive, etc.) local to the client system. With proper authorization, the client system can view and access the storage server's file system through the local storage entity. The files available through the mounted mount point look and act the same as any other files stored in the client system. However, the system resources such as network, CPU, memory, and/or disk I/O throughput that can be allocated to a mount point are limited. Thus, the throughput of an NFS server is often bottlenecked at the mount point.

There are many restrictions in making an NFS server's file system available through NFS mount points. For example, looking-up and subsequent retrieving of a single piece of data cannot be separated and performed through different mount points. In some NFS implementations, even though any files or directory trees can be exported as mount points, a subdirectory under an already exported directory cannot be exported or mounted. An NFS server also cannot export any parent directory of an exported file system, unless the parent directory is located on a different physical device. Because of these restrictions, when a mount point of an NFS server is mapped to an NFS client's local storage entity, all files that are accessible from the mount point are associated only with that mount point, so that these files cannot be exported or accessed via another mount point of the same NFS server. Thus, parallel-transmitting a large file via multiple mount points, though theoretically capable of improving the throughput of the NFS server, is infeasible under a conventional NFS protocol, as the large file is accessible from one and only one mount point.

To improve performance, availability and manageability of a storage solution, individual network storage may be replaced by clusters of storage servers that can be aggregated for providing data services. The aggregated throughput provided by a cluster of storage servers is often significantly higher than the throughputs of the individual network storage servers. However, the conventional NFS protocol does not provide a mechanism that supports multiple servers simultaneously exporting a single file system of a storage server. Even for some NFS implementations that allow the exporting of parents or children of an exported directory, files can still be accessible via only a single server. Thus, the aggregated throughput available in a cluster of storage servers cannot be utilized by NFS clients to increase the performance of an NFS storage solution, or to reduce the bottleneck associated with the NFS mount points. Even though NFS offers simple and cost-effective storage and data sharing, its bandwidth cannot be scaled with the addition of independent servers.

Further, it is often infeasible to eliminate or upgrade NFS storage solutions that are closely integrated with many storage applications because of their popularity. Thus, storage servers are often implemented with cache servers to speed up the retrieval of data for the client systems. As caching often needs to be transparent from the perspectives of client systems, for the client systems that are utilizing NFS for data access, the cache servers must also be implemented and accessed via the NFS protocol. Thus, the limitations of the NFS protocol also affect the performance of cache servers with respect to bandwidth bottlenecks and scalability.

BRIEF DESCRIPTION OF THE DRAWINGS

One or more embodiments of the present invention are illustrated by way of example and not limitation in the figures of the accompanying drawings, in which like references indicate similar elements and in which:

FIG. 3-A illustrates an implementation of a hierarchical cache system with pNFS, for a storage system with pNFS, in a one-to-one mapping of data servers;

FIG. 3-B illustrates an implementation of a hierarchical cache system with pNFS, for a storage system with pNFS, in a many-to-many mapping of data servers;

DETAILED DESCRIPTION

Figure 1:
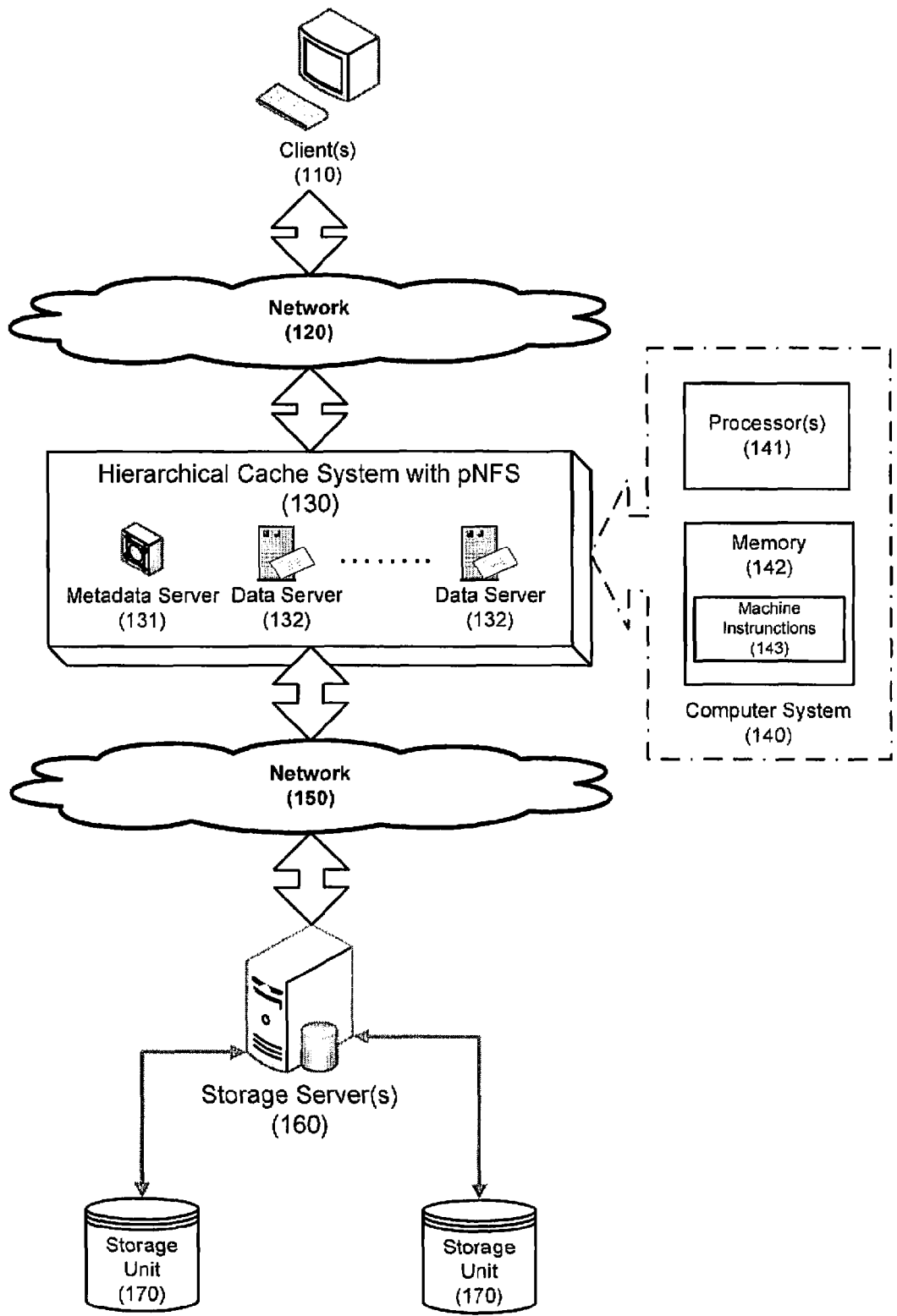
FIG. 1 illustrates a network storage environment in which the present invention can be implemented.

A method and apparatus for implementing a hierarchical cache system with pNFS are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

To improve the performance and scalability of a conventional NFS storage system, a cache system with a pNFS configuration can be implemented to allow concurrent retrieval of data stored in the NFS storage system. Once a large set of data (e.g., a large file) is cached from the NFS storage system to the cache system, a pNFS client can concurrently retrieve the large set of data by simultaneously initiating multiple data requests on the cache system. The pNFS configuration of the cache system can simultaneously respond to these multiple data requests with segments of the requested data cached in the cache system. After all the segments of the data are received from the pNFS configuration, the pNFS client can reconstruct the requested data from these segments. Thus, the cache system with the pNFS configuration greatly improves the bandwidth in delivering data stored in the conventional NFS storage system.

In one embodiment, the pNFS configuration of the cache system contains a metadata server to handle data control requests (e.g., file lookups and opens), and a cluster of data servers to process data access requests (e.g., data writing and retrieving). Together the metadata server and the cluster of data servers form a logical pNFS configuration that allows data to be concurrently retrieved and reconstructed. (Hereinafter, the terms "data server" and "metadata server" refer to a data server and a metadata server in such a logical pNFS configuration). A pNFS client can initiate data control requests on the metadata server, and subsequently and simultaneously invoke multiple data access requests, one request per data server at a time, on the cluster of data servers. Unlike in a conventional NFS environment, in which the data control requests and the data access requests are handled by a single NFS storage server, the pNFS configuration can deploy as many data servers as necessary to serve client requests. Thus, the pNFS configuration can be used to greatly enhance the scalability of a conventional NFS storage system. The protocol specifications for the pNFS can be found at itef.org (e.g., http://tools.ietf.org/wg/nfsv4/).

In one embodiment, the pNFS configuration is implemented on a hierarchical cache system. A hierarchical cache system caches hierarchical-structured data stored in the storage server. For example, data blocks for a file, or files for a directory, can be cached with the hierarchical relationships among the blocks or files maintained in the cache system. During caching, data blocks and their hierarchical relationships can be divided into multiple segments and distributed among the data servers of the pNFS configuration. Logical, sequential, and/or other divisional schemes can be utilized for such data division. Data distribution can include striping and replication. After dividing the data into multiple segments, striping evenly assigns these segments to as many data servers as possible. Replication provides data redundancy by storing multiple copies of the data segments in the data servers. The metadata server of the pNFS configuration manages and controls the dividing of the data and the distribution of the data segments among the data servers. The division and distribution information are maintained in a metadata layout associated with the data.

In one embodiment, a metadata layout, which describes the detail allocation of a particular set of data among the data servers, is maintained by the metadata server. The metadata layout provides a blueprint for retrieving the distributed set of data from the cluster of data servers. The metadata server also collects metadata, which includes descriptive information such as names, locations, access times, etc., about the particular set of data distributed among the data servers. Thus, the pNFS configuration eliminates the concept of mount points as well as the associations between the files and the mount points. By distributing the file system across the cluster of data servers, pNFS also removes the restriction that limits a file system to one NFS server. Accordingly, retrieving a large file is no longer bottlenecked at a single data server, and the scalability of the pNFS configuration can be improved with the addition of more data servers.

In one embodiment, a client system transmits a data request to the metadata server of the pNFS enabled cache system, rather than to the conventional NFS storage system that stores the requested data and has limited throughput and scalability. Upon a determination that the data is cached in the cluster of data servers of the pNFS configuration, the metadata server responds to the request with a metadata layout associated with the requested data. Based on the metadata layout, the client system concurrently initiates multiple data requests to the data servers for the segments of data stored therein. The distribution information in the metadata layout also allows the client system to reconstruct the requested data from the data segments received from the data servers. In addition to serve pNFS clients that are capable of concurrently retrieving and reconstructing the data, the metadata server of the pNFS configuration can also retrieve and reconstruct data for a non-pNFS client. Thus, the cache system with pNFS configuration can be compatible to a conventional cache system for serving NFS clients.

In one embodiment, the hierarchical cache system with a pNFS configuration can also be implemented on the top of a back-end storage system that is also pNFS enabled. Data can be divided into segments and distributed among the data servers of the storage system. Upon receiving a request from the cache system for such data, the storage system can respond with a storage metadata layout to be used for concurrent-loading of the data from the data servers of the storage system to the data servers of the cache system. The data servers of the cache system can have one-to-one or many-to-many relationships with the data servers of the back-end storage system. Thus, the metadata server of the cache system can replicate the metadata layouts received from the metadata server of the storage system, thereby allowing an identical distribution of data in the cache data servers as the distribution of data in the storage data servers. Alternatively, the storage data segments loaded from the storage system can be divided into cache data segments and distributed among the cache data servers. Thus, the cache system with pNFS further improves the throughput and availability of the storage system that is already pNFS enabled.

Refer now to FIG. 1, which shows a network storage environment in which the present invention can be implemented. In FIG. 1, one or more storage servers 160 provide data storage services to one or more clients 110. A client 110 may be, for example, a conventional personal computer (PC), server-class computer, workstation, handheld computing or communication device, or the like. In one embodiment, the client 110 is capable of communicating in pNFS protocol. The client 110 can also communicate in various other network communication protocols such as NFS, HTTP, etc. A storage server 160 can be a file-level server such as used in a NAS environment, a block-level storage server such as used in a SAN environment, or a storage server which is capable of providing both file-level and block-level service. The storage servers 160 receive and respond to various read and write requests from the clients 110, directed to data stored in or to be stored in the storage units 170. The storage units 170 can include, for example, conventional magnetic or optical disks or tape drives; alternatively, they can include non-volatile solid-state memory, such as flash memory, etc.

Although the storage server 160 is illustrated as a single unit in FIG. 1, it can have a distributed architecture. For example, the storage server 140 can be implemented with multiple distributed storage servers. It can also include a network module (e.g., "N-module") and a disk module (e.g., "D-module") (not shown), which communicate with other storage servers. The N-module acts as a front-end of the storage server, exporting services to clients; the D-module acts as the back-end, managing the underlying storage of the storage server. The N-module and D-module can be contained in separate housings and communicate with each other via network connections. Thus, the N-module and the D-module enable a storage server to be physically separated and distributed across a network. In one embodiment, a storage server 160 can include multiple N-modules and D-modules, each of the N-modules corresponding to one or more D-modules, and each of the D-modules corresponding to one or more N-modules. The storage server 160 can also be implemented with a pNFS configuration which contains a metadata server and one or more data servers. Details about the pNFS configuration of a storage server 160 are further described below.

In one embodiment, a hierarchical cache system 130 is implemented between the clients 110 and the storage servers 160 to cache data stored in the storage servers 160 for the clients 110. The clients 110 are connected to the cache system 130 via a network 120, and the cache system 130 is connected to the storage servers 160 via a network 150. The network 120 and 150 may be, for example, a local area network (LAN), wide area network (WAN), metropolitan area network (MAN), global area network such as the Internet, a Fibre Channel fabric, or any combination of such interconnects. Alternatively, the network 120 and 150 can be the same network. Details about the hierarchical cache system with pNFS configuration are further described below.

In one embodiment, the network 120 that connects the cache system 130 with the clients 110 is a local area network, while the network 150 that connects the cache system 130 with the storage servers 160 is a remote network. Since a local area network often has a higher throughput that a remote network, implementing the cache system 130 closer to the clients 110 allows stored data to be transmitted once from the storage servers 160 to the cache system 130 and to be accessed quickly and repeatedly by the clients 110 without going through the slower remote network 150 again. Even if the network 150 is interrupted, the cache system 130 can remain functional and perform offline serving of the cached data to the clients 110. Alternatively, the cache system 130 can be connected to the storage server 160 via a local area network 150 and to the clients via a remote network 120. In this case, the cache system 130 can act as a data replication and/or load balance server for the storage servers 160, serving more clients 110 than a single storage server 160 can.

In one embodiment, the cache system 130 is implemented with a pNFS configuration which contains a metadata server 131 and a cluster of data servers 132. The metadata server 131 provides metadata information about the data stored in the data servers 132. And each of the data servers 132 caches a portion of the data stored in the storage servers 160. Even though in FIG. 1, the metadata server 131 and the data servers 132 are illustrated as separate systems, they are not required to be implemented with separate physical computer systems. Instead, a single or a limited number of physical computer systems can act as a metadata server 131 and/or one or more data servers 132. For example, a metadata server and a data server can be implemented in one physical computer system 140, while the rest of data servers can be implemented in additional physical computer systems 140, etc.

In one embodiment, the computer system 140 that can be utilized to implement a metadata server 131 and/or a data server 132 includes one or more processors 141, memory 142, and other devices (not shown) such as communication devices (e.g., network interfaces, storage interfaces), interconnects (e.g., buses, peripherals), etc. The processor(s) 141 may include central processing units (CPUs) of the computer system 140 and, thus, control the overall operation of the computer system 140. In certain embodiments, the processor(s) 141 accomplish this by executing software or firmware stored in memory 142. The processor(s) 141 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The memory 142 is or includes the main memory of the computer system 140. The memory 142 represents any form of random access memory (RAM), read-only memory (ROM), flash memory (as discussed below), or the like, or a combination of such devices. In use, the memory 142 may contain, among other things, a set of machine instructions 143 which, when executed by processor 141, causes the processor 141 to perform operations to implement embodiments of the present invention.

In one embodiment, when the computer system 140 is implemented as a data server of a pNFS configuration, the memory 142 of the computer system 140 can be used to cache data stored in the storage server 160. Further, the computer system 140 can contain other volatile or non-volatile storage devices (not shown) to extend the caching capacity of the computer system 140. In one embodiment, the computer system 140 can be implemented with a commodity computer. Even though a commodity computer can sustain a limited amount of caching or storage load, the aggregated bandwidth generated by a cluster of computer systems 140 can be scaled to meet the performance demand of the cache system 130.

Figure 2:
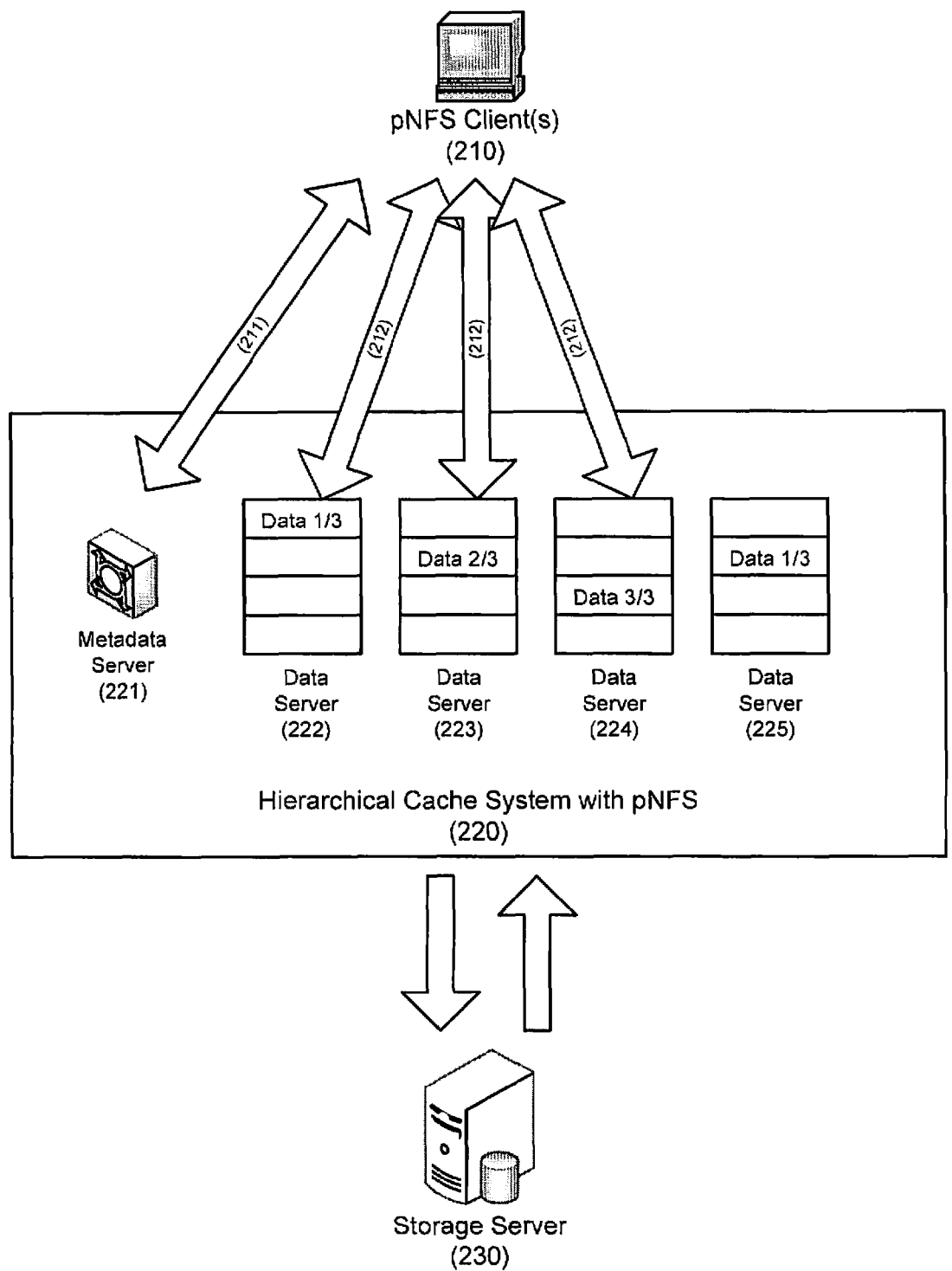
FIG. 2 illustrates an implementation of parallel Network File System (pNFS) for a cache system.

FIG. 2 illustrates an implementation of pNFS for a cache system, in accordance with certain embodiments of the present invention. In FIG. 2, a hierarchical cache system 220 caches data stored or to be stored in a storage server 160 for one or more clients 210. The client 210 can be client 110 of FIG. 1, and is capable of communicating in NFS, pNFS, and/or any other network protocols that are supported by the storage server 230. The storage server 230 can be storage server 160 of FIG. 1. Instead of directly accessing the storage server 230, the client 210 can transmit data requests and receive responses via the hierarchical cache system 220. Thus, the hierarchical cache system 220 reduces the demand on the storage server 230's bandwidth by offloading some of the workload to the cache system 220.

In one embodiment, the hierarchical cache system 220 provides read caching services for the client 210. Upon receiving a read request by the cache system 220 for a piece of data stored in the storage server 230, the cache system 220 checks to see whether the data is available in the cache system 220. If such data is not found in the cache system, a situation commonly referred to as cache miss, read caching service loads the piece of data from the storage server 230 and stores it in the data servers 222-225 of the cache system 220. The data can then be transmitted to the NFS client 210 after it is saved in the cache system 220. When the same data is requested again by the same or a different client 210, as long as the data is not updated in the storage server 230, the cached copy of the data can be immediately located (cache hit), and served to the client 210. Since in a cache hit situation, the data is not required to be retrieved from the storage server 230, a cache system 220 significantly increases the performance and availability of a storage server 230) in providing data services.

In one embodiment, the hierarchical cache system provides write caching service for the clients 210. In a write-through caching scheme, upon receiving a write request from a client 210 to store a piece of data in the storage server 230, the cache system 220 stores the data in the data servers 222-225 and synchronously forwards the write request to storage server 230. Synchronous operation ensures that the data is cached in the cache system 220 and committed to the storage server 230 in a single transaction. Thus, the piece of write data is either stored or not stored at all in both the cache system 220 and the storage server 230. When subsequent read requests are received by the cache system 220 for the data in the previous write request, the data can be retrieved directly from the cache system 220 without accessing the storage server 230.

In one embodiment, the hierarchical cache system 220 implements a write-back caching scheme. In a write-back caching scheme, the data to be stored in the storage server 230 is first cached in the cache system 220 before being persistently stored (committed) to the storage server 230. Periodically, the uncommitted data, which is data that is cached but yet stored to the storage server 230, are asynchronously transmitted in batches to the storage server 230 for persistent storage. Since in an asynchronous operation, the data is deemed stored even though it is not yet committed to the storage system 230, to guarantee that the uncommitted data is not at risk of being lost, the cache system 220 can employ multiple data redundancy policies to make sure that even if the cache system 220 is crashed in disastrous situations, the uncommitted write data previously stored in the cache system 220 can be recovered and re-applied to the storage server 230. Examples of such policies include: utilizing independently and redundantly powered memory to store the uncommitted data; replicating uncommitted data to multiple locations, and/ or employing redundant configurations for the cache system 220, etc.

In one embodiment, the data stored in the cache system 220 can be swapped out of the cache system 220 if it is not frequently requested by the client 210. Swapping out a seldom accessed data removes such data from the cache system to create space for the caching of newly requested data. For example, each piece of data cached can have an associated timestamp and counter indicating the last time the data has been requested and the frequency of such requests. If there is no space left in the cache system 220, and newly requested data is not in the cache system, then less requested data can be removed from, or swapped out of, the cache system 220 to create space for the newly requested data. In addition, cache coherence can be frequently checked to guarantee the consistency of the data stored in the cache system 220. When the data in the storage server 230 is updated or deleted without the knowledge of the cache system 220, the cached data becomes stale, and must be synchronized with the stored data before such data is served to the clients 210.

In one embodiment, the hierarchical cache system 220 can be configured to cache data blocks, files, directories, and/or other logical or physical storage entities stored in the storage server 230. The cache system 220 also maintains hierarchical structures of these storage entities during caching. For example, a file can have a hierarchical structure that is formed by a set of direct and indirect data blocks, the indirect data blocks representing the order and the relationships among the direct data blocks. Or a directory can contain multiple files and/or substructures (subdirectories). During caching of a file, the data blocks associated with the file can be retrieved from the storage server 230 and stored in the cache system 220, and the hierarchical relationships among the data blocks are also maintained in the cache system. During caching of a directory, its files and/or subdirectories can also be cached and organized in the same structure as the one stored in the storage server 230. Maintaining the hierarchical structure in the cache system allows intelligent and efficient caching without duplicating identical data. For example, if a data block is shared among multiple files in the storage server 230, maintaining the hierarchical structure ensures that the same block is similarly shared among the multiple cached files in the cache system, without the same block being replicated in the cache system.

In one embodiment, the hierarchical cache system 220 is implemented with a pNFS configuration. The pNFS configuration divides the cache system 220's services into two types, one for the management of metadata and control, and the other for data caching and accessing. In FIG. 2, the metadata management and control is implemented with a metadata server 221, and one or more data servers 222-225 can be used to cache and serve the data stored in the storage server 230. The metadata managed by the metadata server 221 contains descriptive information about the data cached in the data servers 222-225. Examples of metadata include location, name, creation and modification dates, size, etc. Together the metadata server 221 and the data servers 222-225 form a logical pNFS configuration that can serve multiple concurrent data transmissions. In one embodiment, the storage server 230 is a conventional NFS storage system that has limited bandwidth and scalability. Thus, by implementing the hierarchical cache system 220 on the top of the storage server 230, the pNFS configuration of the cache system 220 enables concurrent retrieval of the data that is originally stored in the storage server 230, thereby greatly improving the throughput and the scalability of serving data to the clients 210.

In one embodiment, a set of data stored in the storage server 230 can be divided into multiple segments (chunks), and distributed among the cluster of data servers in the cache system 220. Data distribution includes striping, replication, and/or the combination thereof. Striping distribution can be determined based on a striping rule, which includes definitions for stripe algorithm, stripe width, and/or stripe orders, etc. The stripe algorithm can specify the manner in which data is apportioned as segments that can be distributed across the data servers. The stripe width specifies the size/width of each segment. And the stripe order manages the sequential order in distributing the segments. In one embodiment, since the cache system maintains the hierarchical structure of the cached data, the striping rule can also take the hierarchical structure of the data into its division consideration. For example, if a file is organized based on a set of direct and indirect data blocks, then the file can be sequentially divided into segments each of which is a single or a fixed number of direct or indirect blocks. Similarly, a directory can be logically divided based on the files and subdirectories contained therein. Alternatively, other dividing schemes can be implemented to divide the data into same-sized or different-sized segments.

In one embodiment, after data to be cached is divided into multiple segments, a striping scheme can ensure that the segments are evenly distributed among the data servers. Even distribution allows as many data servers to participate in the serving of data as possible. In situations when the number of chunks is less than the number of data servers 222-225, even distribution allocates one chunk to one and only one data server. Thus, not all the data servers may be allocated with a chunk. When a large file is divided into a number of chunks that is greater than the number of data servers, even distribution can allocate a similar number of chunks to each data servers. In FIG. 2's example, a piece of data is divided into three chunks: Data 1/3. Data 2/3, and Data 3/3, which are then evenly distributed to data servers 222-224. Thus, a client system 210 can simultaneously retrieve these three chunks from the data servers 222-224.

In one embodiment, data or chunks of the data can be replicated to multiple data servers. Once replicated, multiple client systems 210 can simultaneously retrieve the same data or data chunk from different data servers, thereby reducing data contention on any single data server of the cache system 220. Taking the example of FIG. 2, a chunk of data "Data 1/3" is replicated to data server 222 and data server 225. Thus, a client 210 can read the cached data chunk either from the data server 222 or from the data server 225. Thus, replication spreads the loads of the cache system 220 across multiple data servers 222-225. Further, replicated data can also be used for data redundancy and data recovery if one of the data servers 222-225 becomes inoperable.

In one embodiment, the dividing of data into multiple chunks and the distribution of the chunks among the data servers are performed by the metadata server 221. By utilizing striping, replication, and the combination thereof, the cached data can be distributed in ways that can significantly increase the throughput and the availability of the data for the storage server 230. For example, it a set of data is stripe-distributed to all the data servers 222-225, the cache system 220 can provide up to four times the throughput of a traditional NFS server by concurrently serving the data through these four data servers. Thus, data striping, data replication, and the combination thereof provide a flexible distribution mechanism for optimal utilization of data servers in the pNFS configuration.

In one embodiment, instead of directly communicating with the storage server 230 for data stored in the server 230, a client 210 can request for the data by first transmitting a read request to the metadata server 221 via a communication channel 211. Upon receiving the client's read request, the metadata server 221 evaluates whether an up-to-date copy of the requested data is cached therein, or loads the requested data from the storage server 230 into data servers 222-225 if it is not cached. Afterward, the metadata server 221 returns a metadata layout to the requesting client 110. The metadata layout not only includes the metadata information for the data cached in the data servers 222-225, but also provides the arrangement of the data chunks distributed among the servers 222-225. In FIG. 2, the metadata layout for the specific data may identify the three chunks (i.e., Data 1/3; Data 2/3; and Data 3/3), as well as the respective data servers the chunks are located (i.e., data servers 222, 223 and 224). Alternatively, the metadata layout can also associate the three chunks with a different list of data servers, such as data servers 225, 223 and 224.

In one embodiment, upon receiving the metadata layout from the metadata server 221, the client 210 can perform a concurrent retrieval of the data by simultaneously transmitting multiple data requests to the data servers in which the cached data chunks are contained. In FIG. 2, based on the metadata layout received from communication channel 211, the client 210 can send three simultaneous requests 212 to data servers 222, 223 and 224, one for each of the data servers, requesting for the three data chunks that are cached in these servers. The three data servers 222-224 can concurrently and independently fetch the cached data chunks from their respective storages and return the three chunks to the client 210. Based on the detail information in the metadata layout, the client 110 can then reconstruct the requested data from the three data chunks. For example, the metadata layout could instruct the client 210 to concatenate the three chunks of data in the order of Data 1/3, Data 2/3, and Data 3/3.

In one embodiment, if each of the data servers 222-225 contains more than one chunk of the requested data, but can only process one data request at a time, then the client 210 can transmits the data requests in batches, in each batch one data server receiving one and only one of the data requests. After one batch of data requests are processed by the data servers and the data chunks are received by the client 210, additional batches can be sent to the data servers for further retrieval of data chunks. Alternatively, each of the data servers 222-225 can concurrently process multiple data requests. Thus, the client 210 can simultaneously transmits data requests for all the data chunks, with multiple data requests sent to each of the data servers at the same time.

In one embodiment, the first request transmitted to the metadata server and the subsequent simultaneous requests sent to the data servers can be parts of a read operation initiated from the client 210 under the pNFS protocol. The communications between the client 210 and the hierarchical cache system with pNFS 220 can also be in NFS or other network communication protocols. Since the pNFS configuration reduces bottleneck in transmitting large amount of data, and increases access concurrency, the specific communication mechanisms utilized between the client 210 and individual metadata server/data servers become less relevant. Therefore, the pNFS configuration can be implemented in combination with Fibre Channel, iSCSI, and/or any other standard or proprietary communication protocols. Further, since the client 210 is responsible for reconstructing the data based on the metadata layout, the data cached in the cache system 220 is no longer limited to files. Thus, files, blocks, and/or other logical storage objects can be distributed across the data servers 222-225 in similar fashion.

In one embodiment, the client 210 is aware of the pNFS configuration implemented on the cache system 220. Thus, the client 210 can initiates the two-step data retrieving process by first communicating with the metadata server 221, and then with the relevant data servers 222-225. Alternatively, the cache system 220 can be backward compatible in serving conventional NFS clients. Thus, a conventional NFS client 210 can transmit an NFS data request to the metadata server 221. The metadata server 221 can then retrieve data chunks from the data servers 222-225 and reconstruct the requested data from the chunks at the metadata server 221 for the client 110. Afterward, the reconstructed data can then be returned back to the NFS client 210, without the client 210 being aware of the pNFS nature of the cache system 220. A pNFS enabled cache system 220 can also be implemented on the top of any storage system that has limited bandwidth and scalability. Thus, the benefits of a cache system with a pNFS configuration can be extended to any existing storage solutions.

FIG. 3-A illustrates an implementation of a hierarchical cache system with pNFS, for a storage system with pNFS, in a one-to-one mapping of data servers of the two systems, in accordance with certain embodiments of the present invention. In FIG. 3-A, a hierarchical cache system with a pNFS configuration can also be implemented on the top of a storage system 320 which is also configured in a pNFS arrangement. Thus, the storage system 320 contains its own storage metadata server 321 and one or more storage data servers 322-325. The metadata server 321 and each of the data servers 322-325 can be implemented with a storage server 160 of FIG. 1. The hierarchical cache system 310 is implemented with a pNFS configuration that includes a cache metadata server 311, and one or more cache data servers 312-315 (The term "cache data server" can also be referred to as "cache server").

In one embodiment, the cache data servers 312-315 of the cache system 310 have one-to-one relationships with storage data servers 322-325 of the storage system 320. Thus, the number of cache data servers in the cache system 310 equals to the number of storage data servers in the storage system 320. Thus, a cache data server can be exclusively associated with a storage data server, and vise versa. And each cache data server may exclusively cache data stored in its corresponding storage data server. In the example as illustrated in FIG. 3-A, data chunk "Data 1/4" is stored in storage data server 322, and can be exclusively cached in cache data server 312, data chunk "Data 2/4" is stored in storage data server 323 and cached in cache data server 3113, data chunk "Data 3/4" is stored in storage data server 324 and cached in cache data server 314, and data chunk "Data 4/4" is stored in storage data server 325 and cached in cache data server 315, etc.

In one embodiment, having one-to-one mappings between cache data servers and storage data servers simplifies data retrieving and data allocating processes. During caching operation, after receiving a data request from the client, the cache metadata server 311 can forward the request to the storage metadata server 321 for a storage metadata layout that describes the distribution of the data among the storage data servers 322-325. Instead of reconstructing a data distribution layout, the cache metadata server can simply duplicate such storage metadata layout for the layout of the cache data in cache data servers. Thus, each of the cache data servers 312-315 can issue parallel/concurrent data requests to its corresponding storage data server 322-325. Such approach is advantageous since each of the cache data servers 312-315 can perform cache coherence checking on a data chunk by directly accessing the associated storage data servers. Thus, a separate inquiry to ascertain whether the storage data server contains such data chuck is no longer necessary. The storage metadata layout obtained from the storage metadata server 321 can then be forward to clients by the cache metadata server 311 as a cache metadata layout.

FIG. 3-B illustrates an implementation of a hierarchical cache system with pNFS, for a storage system with pNFS, in a many-to-many mapping of data servers of the two systems, in accordance with certain embodiments of the present invention. In FIG. 3-B, a hierarchical cache system can be implemented on the top of a pNFS configured storage system 340 which contains more data servers 342-345 than the cache system 330 does (data servers 332-334). Alternatively, the cache system 330 may contain more data servers than the storage system 340 does. Thus, upon receiving a storage metadata layout from the storage metadata server 341, the cache metadata server 331 generates a cache metadata layout and performs a different distribution of the data chunks among its cache data servers 332-334. Afterward, the cache data servers 332-334 initiate data requests to the storage data servers 342-345 to cache the corresponding data chunks. The cache metadata layout can then be separately generated and transmitted to a client system for retrieval of cached data chunks in the cache data servers 332-334.

In one embodiment, having a number of cache data servers that is different from the number of storage data servers provides flexibilities in implementing the cache system 330 for a storage system 340. This approach is especially valuable when the storage system 340 is implemented with a cluster of servers that are not pNFS compatible. Thus, the cache metadata server 331 is required to generate a cache metadata layout as well as distribute the data chunks among the cache data servers. In one embodiment, the cache metadata server 331 and the storage metadata server 341 can be combined into one. In this case, the combined metadata server acts as a data routing server, routing user requests to the actual copies of the data in the storage data servers and the cached copies of data that are replicated from the actual copies.

Figure 4:
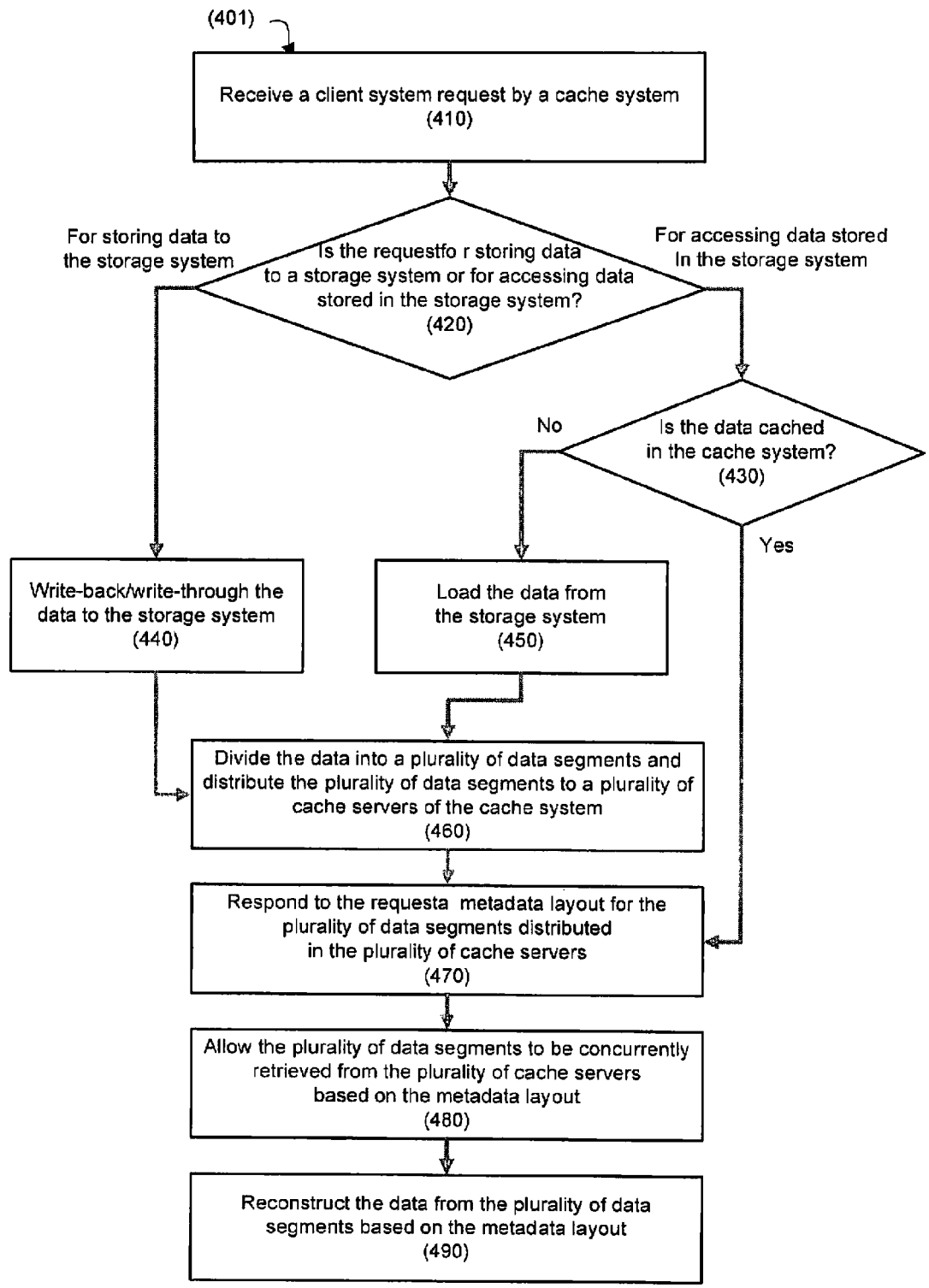
FIG. 4 illustrates a flow diagram of a process for implementing a hierarchical cache system with a pNFS configuration, on a conventional storage system.

FIG. 4 illustrates a flow diagram of a process 401 for implementing a hierarchical cache system with a pNFS configuration, on a storage system without a pNFS configuration, in accordance with certain embodiments of the present invention. The process 401 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 401 can be stored in memory 142 of FIG. 1, executed by the processor 141 of FIG. 1, and/or implemented in a cache system 130 of FIG. 1.

Referring back to FIG. 4, at 410, a client data request initiated by a client system is received by a cache system which contains a pNFS configuration for caching data stored in a storage system. The cache system contains a metadata server and multiple cache data servers. The storage system can be a conventional NFS server, or any other storage server that does not have pNFS, clustered, or other parallel-accessible configuration. At 420, process 401 evaluates whether the client data request is a write request (for storing data to a storage system) or a ready request (for accessing data already stored in the storage system). If the request is a write request, then process 401 proceeds to 440 to allow the cache system to perform a write-back/write-through of the data to the storage system. After the write-back/write-through operation at 40, process 401 proceeds to 460 to divide and distribute the data in the write request. If the request determined at 420 is a read request, process 401 proceeds to 430 to evaluate whether the requested data is already cached in the cache system. At 430, if a cached copy of the data is found in the cache system, process 401 also determines whether the cached copy of the data is up-to-date comparing to the same data stored in the storage system. If the cached copy is stale, then the requested data is deemed not cached, and the stale copy of the data is removed from the cache system.

Upon a determination at 430 that the data is cached in the cache system, process 401 proceeds to 470, at which the metadata server provides a metadata layout as a response to the read request. Otherwise, process 401 proceeds to 450, at which the cache system loads the requested data from the storage system, and then proceeds to 460. At 460, the data to be cached can be divided evenly into multiple fixed-size data segments (chunks). Such data division can be performed by a metadata server of the cache system. The fixed-size can be the block or page size used by the cache system to cache the data. The metadata server also stripe-distributes or replicated the divided data segments among the multiple cache servers of the cache system. After distribution, the data segments are cached across the cache servers. The metadata server maintains the metadata about the data segments and the distributions of these segments.

At 470, in response to a read request received at 410, the metadata server of the cache system constructs a metadata layout for the data that is significant to the request, and is cached in the cache servers. The metadata layout lists the data segments for the data, the order among these data segments, as well as the cache servers these data segments are cached. The metadata layout can then be returned back to the client system as a response to the read request. The metadata layout can also be used to respond to any subsequent read requests seeking access to the same cached data. For a write request received at 410, the client system can issue subsequent read requests to the cache system for the write request data that has been written to the storage system and cached to the cache system.

At 480, after receiving the metadata layout, as a part of a read request, the client system can simultaneously initiate multiple data requests toward the cache servers that contain the data segments listed in the metadata layout. The multiple data requests are simultaneously processed by the cache servers, allowing the data segments to be concurrently retrieved from the cache servers and transmitted to the client system. At 490, based on the metadata layout, the retrieved data segments can be used to reconstruct the data retrieved from the cache system. In one embodiment, a pNFS-aware client system can perform the reconstruction of the data as a part of or subsequent to the read request the client system initiated. Alternatively, the data reconstruction can be done at the cache system to encapsulate the pNFS configuration for a non-pNFS compatible client system. Thus, process 401 enables a cache system to distribute data stored in a storage system among multiple cache servers, thereby allowing a client system to concurrently load and reconstruct such data from the cache system.

Figure 5:
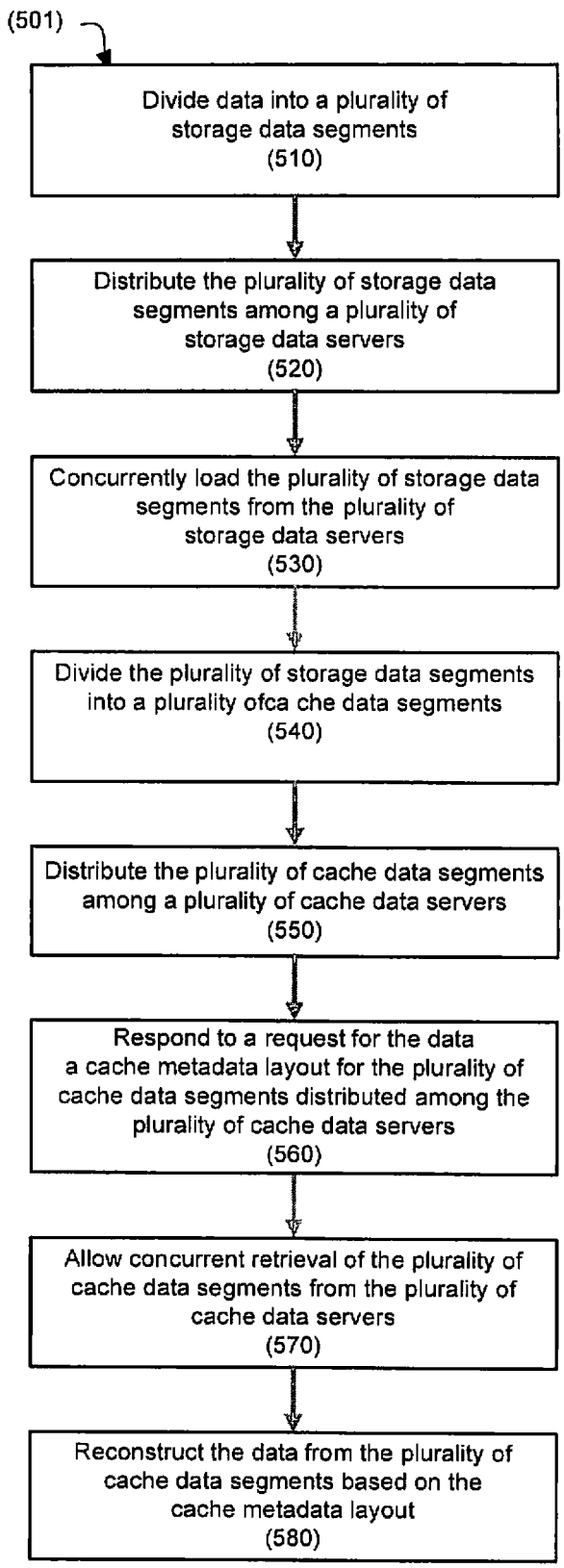
FIG. 5 illustrates a flow diagram of a process for implementing a hierarchical cache system with a pNFS configuration, on a storage system that is also configured with pNFS.

FIG. 5 illustrates a flow diagram of a process 501 for implementing a hierarchical cache system with a pNFS configuration, on a storage system that is also configured with pNFS, in accordance with certain embodiments of the present invention. The process 501 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 501 can be stored in memory 142, executed by a processor 141, and/or implemented in a computer system 140 of FIG. 1.

In one embodiment, the storage system is configured with pNFS and has its own storage metadata server and cluster of storage data servers. At 510, a write request is received from the cache system or other sources to store data in the storage system. The storage metadata server divides the data into multiple storage data segments. At 520, the multiple storage data segments are distributed by the storage metadata server to the cluster of storage data servers. With the help of the metadata server, the storage system is capable of providing concurrent retrieval of the data stored in the cluster of storage data servers. At 530, a cache system intends to cache the stored data in the storage system. The cache system can initiate a data request to the storage metadata server. The storage metadata server can respond with a storage metadata layout to the cache system.

In one embodiment, based on the storage metadata layout, the cache system can initiate simultaneous data requests to the cluster of storage data servers to concurrently load the stored data segments for the requested data. Upon receiving the storage data segments from the storage data servers, the cache system can reconstruct the data from the data segments. Alternatively, the cache system can skip the reconstruction of the data and proceed to 540. Since the cache system is configured with pNFS capability, it also contains a cache metadata server and a cluster of cache data servers. Thus, the data loaded from 530 can be stored to the cluster of cache data servers in similar manner as the storing of such data in the storage data servers.

At 540, if the data from the storage system is reconstructed back to its original form, the data can be divided into multiple cache data segments. Alternatively, the stored data segments loaded from 530 can be used for generating of the cache data segments. In one embodiment the number of cache data servers is equal to the number of storage data servers. Thus, each cache data server can correspond to a separate storage data server. In this case, the storage data segments can be used as the cache data segments, and the storage metadata layout received at 530 can also be used for distributing the cache data segments among the cache data servers. After the data is cached, each of the cache data servers can directly access its corresponding storage data server for data coherence checking and cached data updates. Thus, a one-to-one correspondence greatly simplifies the implementation of the cache system based on the storage system.

In one embodiment, the number of cache data server is not equal to the number of storage data servers. In this case, the storage data segments can still be used as the cache data segments, but the storage metadata layout cannot be used as the cache metadata layout for cache data distribution. Thus, the cache metadata layout must be freshly generated by the cache metadata server. If the number of cache data servers is less than the number of storage data servers, then some of the storage data segments must be cached to a single cache data server. If the number of cache data servers is larger than the number of storage data servers, then some of the cache data servers may be spared from storing stored data segments. Alternatively, the data can always be reconstructed back to its original form before being divided and distributed to multiple cache data segments.

At 550, the multiple cache data segments can then be stripe-distributed or replicated among the cluster of cache data servers. After distribution at 550, the cache system is ready for concurrent loading of the cached data from the cluster of cache data servers. At 560, a read request for the specific data is transmitted from a client system and is received by the cache metadata server of the cache system. The cache metadata server provides a cache metadata layout as a response to the client system. The cache metadata layout contains detail distribution information about the cache data segments distributed among the cache data servers. At 570, based on the cache metadata layout received at 560, the client system subsequently and concurrently initiates multiple requests to the cache data servers, in order to simultaneously retrieve the cache data segments from these cache data servers. At 580, based on the cache metadata layout, the specific data can then be reconstructed from the cache data segments. Thus, the cache system with pNFS allows concurrent retrieval of data stored in a storage system that is also pNFS configured.

Thus, methods and systems for extending hierarchical cache system with pNFS have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software and/or firmware to implement the techniques introduced here may be stored on a machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible storage medium includes recordable/non-recordable media (e.g., read-only memory (ROM); random access memory (RAM), magnetic disk storage media; optical storage media; flash memory devices, etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for concurrently serving storage data comprising:
   reconstructing, by a cache system, a set of data from a plurality of storage data segments stored in a storage system responsive to the set of data being loaded into the cache system;
   dividing the reconstructed set of data into a plurality of cache data segments;
   distributing the plurality of cache data segments among a plurality of cache servers of the cache system;
   in response to a request to access the set of data, generating a cache metadata layout of the plurality of cache data segments with respect to the plurality of cache servers; and
   using the cache metadata layout to enable the plurality of cache data segments to be concurrently retrieved from the plurality of cache servers for serving the request to access the set of data.

2. The method as recited in claim 1, further comprising: reconstructing the set of data from the plurality of cache data segments based on the cache metadata layout.

3. The method as recited in claim 1, wherein the set of data is a file.

4. The method as recited in claim 1, wherein the plurality of cache data segments are stripe-distributed among the plurality of cache servers.

5. The method as recited in claim 4, wherein one or more of the plurality of cache data segments are replicated among the plurality of cache servers.

6. The method as recited in claim 1, wherein the cache metadata layout illustrates an arrangement of the plurality of cache data segments distributed-among the plurality of cache servers.

7. The method as recited in claim 1, wherein the storage system comprises a plurality of data servers, and the set of data is divided and distributed among the plurality of data servers.

8. The method as recited in claim 7, further comprising: concurrently loading the set of data from the plurality of data servers to the plurality of cache servers.

9. The method as recited in claim 7, wherein the plurality of cache servers have one-to-one associations with the plurality of data servers.

10. The method as recited in claim 7, wherein a metadata server manages distribution of the set of data among the plurality of cache servers and the plurality of data servers.

11. The method as recited in claim 1, wherein the method is embodied in a machine-readable non-transitory storage medium as a set of instructions which, when executed by a processor, cause the processor to perform the method.

12. The method as recited in claim 1, wherein the cache system is communicatively coupled to the storage system via a single NFS mount point.

13. The method as recited in claim 1, wherein reconstructing the set of data from the plurality of storage data segments stored in the storage system is based on a storage metadata layout, and wherein the storage metadata layout illustrates an arrangement of the plurality of storage data segments distributed-among a plurality of storage servers.

14. A method for concurrently serving storage data comprising:
   dividing a set of data into a plurality of storage data segments;
   distributing the plurality of storage data segments among a plurality of storage data servers of a storage system;
   concurrently loading, by a cache system, the plurality of storage data segments from the plurality of storage data servers;
   reconstructing, by the cache system, the set of data from the plurality of storage data segments stored in the storage system responsive to the set of data being loaded into the cache system;
   dividing the reconstructed set of data into a plurality of cache data segments;
   distributing the plurality of cache data segments among a plurality of cache data servers of the cache system, wherein the cache data segments are not the same segments as the storage data segments; and
   allowing concurrent retrieval of the plurality of cache data segments from the plurality of cache data servers.

15. The method as recited in claim 14, further comprising:
   in response to a request for the set of data, generating a cache metadata layout of the plurality of cache data segments distributed among the plurality of cache data servers; and
   reconstructing the data from the plurality of cache data segments based on the cache metadata layout.

16. The method as recited in claim 15, wherein the plurality of cache data segments are distributed among the plurality of caching data servers based on the cache metadata layout provided by a cache metadata server of the cache system.

17. The method as recited in claim 16, wherein the plurality of storage data segments are distributed among the plurality of storage data servers based on a storage metadata layout provided by a storage metadata server of the storage system.

18. The method as recited in claim 17, wherein the data is concurrently cached from the plurality of storage data servers to the plurality of caching data servers, and the cache metadata layout is generated based on the storage metadata layout.

19. The method as recited in claim 14, wherein each of the plurality of cache data servers corresponds to one of the plurality of storage data servers.

20. The method as recited in claim 14, wherein the method is embodied in a non-transitory machine-readable storage medium as a set of instructions which, when executed by a processor, cause the processor to perform the method.

21. A system comprising:
   a cache system including a plurality of cache servers, wherein each of the plurality of cache servers is configured to serve data stored therein; and
   a metadata server coupled with the plurality of cache servers, wherein the metadata server is configured to:
      load a set of data stored in a storage system;
      reconstruct the set of data from a plurality of storage data segments stored in the storage system responsive to the set of data being loaded into the cache system;
      divide the reconstructed set of data into a plurality of cache data segments;
      distribute the cache data segments as a plurality of data segments among the plurality of cache servers; and
      in response to a read request to access the set of data stored in the storage system, generate a cache metadata layout of the plurality of cache data segments distributed among the plurality of cache servers, wherein the cache metadata layout allows the plurality of cache data segments to be concurrently retrieved from the plurality of cache servers.

22. The system as recited in claim 21, wherein the metadata server is further configured to reconstruct the set of data from the plurality of cache data segments based on the cache metadata layout.

23. The system as recited in claim 21, further comprising:
a client system coupled with the metadata server, wherein the client system is configured to:
send the read request;
concurrently send a plurality of data access requests to the plurality of cache servers; and
reconstruct the set of data from the plurality of cache data segments concurrently received from the plurality of cache servers.

24. The system as recited in claim 21, wherein the storage system comprises a plurality of storage data servers, and the plurality of cache servers are configured to concurrently load the set of data from the plurality of storage data servers based on a storage metadata layout.

25. A method for concurrently serving storage data comprising:
caching a set of data stored in a storage system to a cache system by reconstructing a set of data from a plurality of storage data segments stored in a storage system responsive to the set of data being loaded into the cache system, dividing the set of data stored in the storage system into a plurality of cache data segments responsive to the set of data being loaded into the cache system from the storage system, and distributing the plurality of cache data segments among a plurality of cache servers of the cache system, wherein the cache system has a concurrent retrieval configuration, and the storage system does not provide for concurrent retrieval of the set of data; and
using a cache metadata layout to enable the plurality of cache data segments to be concurrently retrieved from the cache system for serving a request to access the set of data.

26. The method as recited in claim 25, wherein the concurrent retrieval configuration is a parallel Network File System (pNFS) configuration containing a metadata server and a plurality of cache data servers, and said caching of the set of data further comprises:
stripe-distributing the plurality of cache data segments across the plurality of cache data servers.

27. The method as recited in claim 26, wherein said allowing the set of data to be concurrently retrieved further comprises:
in response to a request to access the set of data, generating, by the metadata server, a cache metadata layout of the plurality of data segments distributed across the plurality of data servers; and
using the cache metadata layout to enable the plurality of data segments to be concurrently retrieved from the plurality of cache data servers.

\* \* \* \* \*